3,374,255
PROCESS FOR THE HALOETHYNYLATION
OF GONA-ENE-3,17-DIONES
Thomas B. Windholz, Westfield, and Arthur A. Patchett, Cranford, N.J., and John Fried, Palo Alto, Calif., assignors to Merck & Co., Inc., Rahway, N.J., a corporation of New Jersey
No Drawing. Continuation-in-part of application Ser. No. 227,582, Oct. 1, 1962. This application Apr. 8, 1966, Ser. No. 541,070
6 Claims. (Cl. 260—397.4)

This application is a continuation-in-part of our copending application Ser. No. 227,582 filed Oct. 1, 1962, now Patent No. 3,242,197.

This invention is concerned with novel processes for the preparation of 17α-ethynyl- and 17α-haloethynyl-17β-hydroxy-gona-4-ene-3-ones which may be further unsaturated in the B and the C rings. More particularly it is concerned with the preparation of these valuable compounds from the corresponding 3,17-diones without the necessity of protecting the 3-keto group.

Among the valuable compounds which may be prepared in accordance with this invention are those represented by the formula:

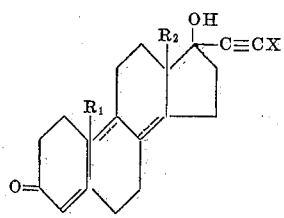

wherein $R_1$ is hydrogen or methyl; $R_2$ is hydrogen or lower alkyl; and X is hydrogen, bromine or chlorine. The dotted lines indicate the optional presence of double bonds. If a double bond is present in the 9(10)-position, $R_1$ is hydrogen. If a double bond is present in the 8(14)-position, it must be conjugated with double bonds in the 4- and the 9(10)-positions.

Many of the compounds which may be prepared in accordance with this invention are physiologically active or can be used to prepare physiologically active compounds which are therapeutically useful for their estrogenic, androgenic, progestational or related activity. The compounds 17α-ethynyl-19-nortestosterone and its 17α-chloroethynyl analog may be mentioned by way of example of therapeutically useful compounds which may be prepared in accordance with this invention.

Processes are known for the conversion of steroidal 3,17-diones to the corresponding 17β-hydroxy-17α-ethynyl or haloethynyl compounds, but the methods are generally unsatisfactory, since if the 3-keto group is not protected, reaction takes place at both the 3- and the 17-positions with the result that mixtures are obtained which can only be separated with great difficulty. On the other hand, if the 3-keto group is protected, for example by reaction with ethylene glycol, the protecting group must be removed in an additional step. This additional step adds to the cost of the preparation and may adversely affect the overall yield.

It is now possible in accordance with this invention to produce the desired 17α-haloethynyl compounds substantially free of undesirable by-products without the necessity of protecting the 3-keto group. The reaction is carried out by reacting the corresponding 3,17-dione with an alkali metal chloroacetylide or bromoacetylide in liquid ammonia. Sodium and potassium are the preferred alkali metals because of their ready availability. In a further aspect of the invention, the halogen atom in the haloethynyl group is selectively removed by a unique reductive procedure.

Reaction for the production of 17α-ethynyl compounds is most conveniently effected by mixing the steroid; preferably in a reaction inert organic solvent, especially ether solvents containing up to eight carbon atoms including cyclic ethers such as dioxane or tetrahydrofuran or dialkyl ethers such as dimethyl ether, methyl ethyl ether or di-n-butyl ether, in a liquid ammonia solution containing the haloacetylide carbanion formed in situ by reaction between an alkali metal acetylide and the selected dihaloethylene, preferably cis-dichloroethylene or cis-dibromoethylene. Preferably the steroid is added as rapidly as possible so as to minimize side reactions. The reaction mixture is held at the reflux temperature of liquid ammonia for a period of from about 1½ to about 24 hours to complete the reaction. The preferred time of reaction which is consistant with high yields under practical operating conditions is from about 2 to 4 hours.

More specifically, reaction may be effected by first forming an alkali metal amide by addition of the selected alkali metal such as sodium or potassium to excess ammonia. From about 0.5 to about 1.0 mole of cis-dihaloethylene per mole of alkali metal is then added to the liquid ammonia solution of the alkali metal amide and the mixture allowed to reflux for from about 15 minutes to about 2 hours, to form the haloacetylide. To this mixture there is then added from about 0.5 to 1.0 mole of steroid per mole of alkali metal and the mixture allowed to react as described above. It is best to add the steroid at a rate of from about 1 to 2 grams per minute to obtain the best yields.

The desired product may be isolated in any convenient manner as illustrated in the examples.

For the preparation of the ethynyl compounds in accordance with the process of the invention, the haloethynyl compound is reductively dehalogenated with metallic zinc in a lower alkanoic acid, which may contain up to four carbon atoms. Acetic acid is preferred because of its ready availability.

In the presently preferred process for effecting the desired reductive dehalogenation the selected steroid is reacted with from about 0.5 to about 2 times its weight of zinc metal based on the weight of steroid in the selected alkanoic acid. Temperature and time of reaction may vary widely, for example, the reaction may be carried out during a period of from about one to twenty-four hours at a temperature of from about 20° C. to about 100° C. Most preferably, from the point of view of obtaining high yields within practical reaction times without the necessity of heating, the reaction is carried out at room temperature i.e. 20° C. to 30° C. from two to four hours. The product normally precipitates and may be separated by extraction of the precipitate with an organic solvent, suitably a hydrocarbon or halogenated hydrocarbon solvent containing up to six carbon atoms, preferably chloroform or ethylene dichloride. The product may be isolated after suitable washings and dryings, as illustrated in the examples, by removal of the solvent at low pressure.

The process of this invention is applicable to a wide variety of 3,17-diketo steroids of the gonene series containing 17 to 19 carbon atoms in the steroid nucleus including those which may have additional reaction inert substituents such as alkyl groups or halogen atoms. As specific examples of compounds which may be prepared by the process of this invention using known 3,17-diketo steroids as starting compounds there may be mentioned:

10,13-dimethyl-17α-chloroethynyl-17β-hydroxy-gona-4-ene-3-one 10,13-dimethyl-17α-bromoethynyl-17β-hydroxy-gona-4-ene-3-one
10,13-dimethyl-17α-ethynyl-17β-hydroxy-gona-4-ene-3-one
13-methyl-17α-chloroethynyl-17β-hydroxy-gona-4-ene-3-one
13-methyl-17α-bromoethynyl-17β-hydroxy-gona-4-ene-3-one
13-methyl-17α-ethynyl-17β-hydroxy-gona-4-ene-3-one
13-methyl-17α-chloroethynyl-17β-hydroxy-gona-4,9(10)-diene-3-one
13-methyl-17α-bromoethynyl-17β-hydroxy-gona-4,9(10)-diene-3-one Other starting materials useful in accordance with the process of this invention may be prepared in accordance with the procedures illustrated in the following preparations.

PREPARATION 1

The following illustrates the preparation of 6-oxo-1-vinyl-2,3,4,6,7,8-hexahydronaphthalene, which may also be designated as 1-vinyl-$\Delta^{1(9),5(10)}$-hexalone-6, starting from 6-methoxy-α-tetralone.

*Step 1.—Preparation of 1,2,3,4-tetrahydro-6-methoxy-1-naphthol*

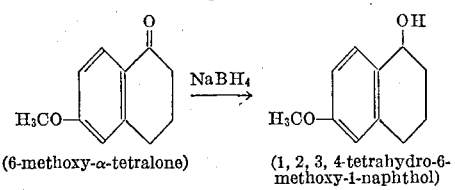

(6-methoxy-α-tetralone)     (1, 2, 3, 4-tetrahydro-6-methoxy-1-naphthol)

Eight grams of 6-methoxy-α-tetralone, the synthesis of which has been reported by G. Stork in JACS, 69, 576 (1947), are dissolved in 320 ml. of methanol and cooled to 0° C. A freshly prepared solution of 8 g. NaBH$_4$ in 80 ml. H$_2$O is added with stirring. The resulting solution is stirred for an additional 12 hours at room temperature, neutralized with NaH$_2$PO$_4$, and the methanol removed in vacuo. The residue is extracted with ether, washed with water, dried and concentrated to a heavy oil; yield 7.10 grams of 1,2,3,4-tetrahydro-6-methoxy-1-naphthol. The reaction of Step 1 may be represented by the above equation.

*Step 2.—Preparation of 6-oxo-1-vinyl-2,3,4,6,7,8-hexahydronaphthalene*

The 1,2,3,4-tetrahydro-6-methoxy-1-naphthol obtained from Step 1 is converted to 6-oxo-1-vinyl-2,3,4,6,7,8-hexahydronaphthalene substantially according to the process described in Izvest. Akad. Nauk SSSR—Otdel. Khim. Nauk, 1803 (1961). The conversion involves four steps which may be represented in flow chart form as follows:

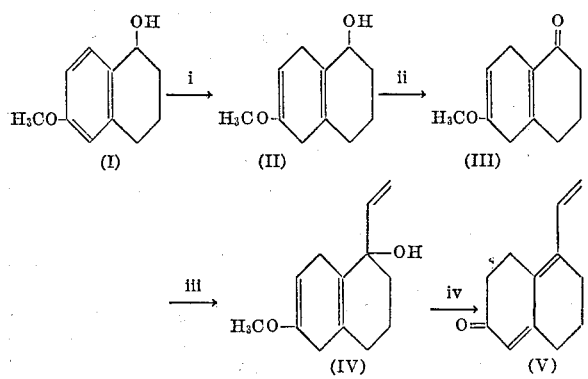

(i) REDUCTION OF 1,2,3,4,-TETRAHYDRO-6-METHOXY-1-NAPHTHOL 6.65 grams of 1,2,3,4-tetrahydro-6-methoxy-1-naphthol (I), the reduction product obtained in Step 1, are dissolved in a mixture of 160 ml. tetrahydrofuran and 160 ml. tertiary-butanol, which is then added to a round bottom flask fitted with a reflux condenser and containing 10.3 g. sodium in 390 ml. liquid ammonia. The system is purged with nitrogen gas and the mixture refluxed for 4½ hours. The flask is then cooled, 25 ml. methanol are added and the ammonia is evaporated off. The residue is concentrated in vacuo and the 1,2,3,4,5,8-hexahydro-6-methoxy-$\Delta^{6,9}$-hexalol is extracted by the conventional ether-water distribution technique. The ether layer is separated and the aqueous layer is further extracted with ether. The combined ether extracts are washed with water, dried over anhydrous K$_2$CO$_3$ and concentrated in vacuo to yield 6.40 grams of (II).

(ii) OXIDATION OF 1,2,3,4,5,8-HEXAHYDRO-6-METHOXY-1-NAPHTHOL 12 grams of aluminum isopropoxide and 6.40 grams of (II) are added to 28 ml. of dry toluene under nitrogen and dissolved therein with slight heat. 16 ml. dry acetone are added and the mixture refluxed for 4½ hours. The mixture is then cooled, 12 ml. of water are added and the mixture is extracted four times wtih ether. The ether extracts are combined, dried over anhydrous K$_2$CO$_3$ and concentrated in vacuo to yield 6.00 g. of 3,4,5,8-tetrahydro-α-tetralone.

(iii) PREPARATION OF VINYLCARBINOL

A freshly prepared solution of 16 g. of vinyl bromide in 16 ml. tetrahydrofuran is added to 2.54 grams magnesium in 22 ml. tetrahydrofuran under a nitrogen atmosphere to prepare vinylmagnesium bromide (Grignard reagent). To this is added 5 grams of (III), dissolved in a mixture of 22 ml. ether and 6.3 ml. tetrahydrofuran. After 24 hours, the mixture is boiled for 1½ hours, cooled and poured into a mixture of 15 g. of ammonium chloride and 75 g. of ice. The organic layer is separated and the aqueous layer is extracted three times with ether. The extracted 1,2,3,4,5,8-hexahydro-6-methoxy-1-vinyl-1-naphthol (IV) need not be isolated before proceeding with the next step.

(iv) PREPARATION OF TRIENEONE

The ether extracts of Step 2 (iii) are added to a mixture of 100 ml. of 2.5 N NCl and 20 g. of ice and stirred for 4 hours at room temperature under nitrogen. The ether layer is separated and the aqueous layer extracted with ether. The combined ether extracts are washed two times with aqueous NaHCO$_3$, two times with ice cold water, dried over Na$_2$SO$_4$ and concentrated in vacuo to yield 4.10 g. of 6,oxo-1-vinyl-2,3,4,6,7,8-hexahydronaphthalene (V), a yellow oil.

PREPARATION 2

This preparation illustrates a method of preparing the cyclopentane-1,3-dione derivatives that are utilized in this invention. The method involves three steps, (1) the preparation of a triketoglyoxalate, (2) the preparation of a diketosemicarbazone, and (3) the preparation of a cyclopentadione, as illustrated more specifically immediately hereinafter with the preparation of 2-methyl-cyclopentane-1,3-dione.

*Step 1.—Preparation of triketoglyoxalate*

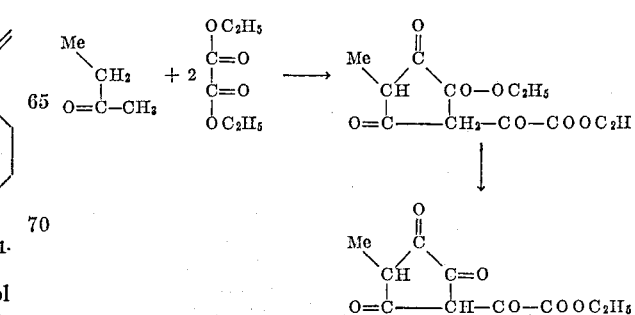

108 grams (2 moles) of fresh sodium methoxide are carefully dissolved in ice-cooled 580 ml. absolute alcohol and then cooled to 5° C. With stirring and continued cooling, a mixture of 72 g. (1 mole) of ethylmethylketone and 320 g. (2.2 moles) of diethyloxalate is added over a period of 30 minutes and then heated at 50° C. for 40 minutes. The mixture is cooled in an ice bath and, with strong stirring, a cold mixture of 55 ml. conc. $H_2SO_4$ and 55 ml. $H_2O$ is slowly added. After addition, the reaction mixture is allowed to come to room temperature and the salt filtered. The filtrate is concentrated in vacuo to about 200 ml. On cooling, a precipitate is obtained, which is recrystallized from ethyl acetate. The resulting crystalline product, 4-methyl-2,3,5-trioxycyclopentane glyoxylic acid ethyl ester, is filtered and dried; yield: 70 g.; M.P. 158–160° C. The reaction of Step 1 may be represented by the above equation.

*Step 2.—Preparation of diketosemicarbazone*

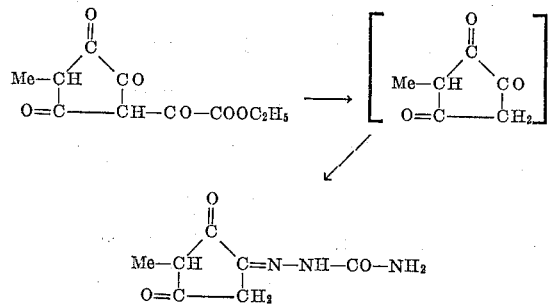

70 grams (0.31 mole) of the triketoglyoxalate obtained from Step 1 is suspended in 1050 ml. of 2.5 N HCl and slowly heated with stirring to reflux. After refluxing for about 1 hour, the solution is cooled to room temperature and added to an equal volume of alcohol. At room temperature there is then added dropwise with stirring over a period of 1½ hours a solution of 53.5 g. (0.79 mole) of semicarbazide-HCl and 74 g. of Na-acetate in 490 ml. $H_2O$. A precipitate of 3-methyl-2,4-cyclopentadione-1-semicarbazone is obtained; yield: 54 g. The material has no sharp melting point, decomposing around 290° C. The reaction of Step 2 may be represented by the above equation.

*Step 3.—Preparation of 2-methylcyclopentane-1,3-dione*

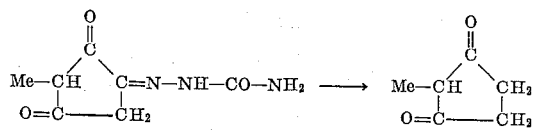

Fifty-four grams of KOH are dissolved with stirring in 540 ml. ethylene glycol and the solution heated to 130° C. Fifty-four grams of the semicarbazone obtained in Step 2 is then added gradually and with stirring and the mixture refluxed for 1½ hours. The mixture is then cooled and concentrated under vacuum (0.5 mm.) to dryness. The residue is dissolved in water, ice-cooled and acidified to pH 3. A precipitate of 2-methylcyclopentane-1,3-dione is obtained which is filtered off and dried; yield: 27.4 g.; M.P.: 205–208° C. The reaction of Step 3 may be represented by the above equation.

PREPARATION 3

The procedures of Preparation 2 are followed except that equivalent quantities of other ketones are utilized in place of the ethylmethyl ketone of Step 1 therein, thereby obtaining various derivatives of cyclopentane-1,3-dione. Accordingly, the use of other lower alkylmethyl ketones, such as propylmethyl ketone, isobutylmethyl ketone, n-butylmethyl ketone and amylmethyl ketone, yields the corresponding 2-lower alkylcyclopentane-1,3-dione compounds, such as 2-ethylcyclopentane-1,3-dione, 2-isopropylcyclopentane-1,3-dione, 2-n-propylcyclopentane-1,3-dione and 2-n-butylcyclopentane-1,3-dione, respectively.

PREPARATION 4

This preparation illustrates the preparation of 13-methyl - gona - 4,8(14), 9 - triene-3,17-dione from the interaction of 6 - oxo - 2,3,4,6,7,8 - hexahydronaphthalene and 2 - methylcyclopentane-1,3-dione. The reaction may be represented as follows:

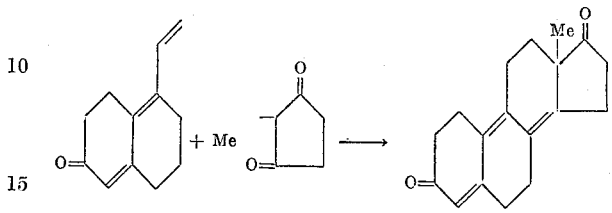

6.50 grams of 6 - oxo - 1-vinyl-2,3,4,6,7,8-hexahydronaphthalene are dissolved in a mixture of dry xylene (27 ml.) and tertiary-butanol (13.5 ml.) and to this are added 4.05 g. of 2-methylcyclopentane-1,3-dione and 1.81 ml. diethylamine. The resulting mixture is refluxed for 40 hours and then concentrated in vacuo. The residue is dissolved in methylene chloride, washed successively with aqueous $NaHCO_3$, dilute HCl and water, dried and concentrated in vacuo. The resulting concentrate is chromatographed on acid washed alumina and eluted with benzene-chloroform mixtures to yield 1.6 g. of 13-methyl-gona - 4,8(14),9 - triene-3,17-dione, M.P. 130–131° C. Analysis of the product found C=80.90%, H=80.56%, H=7.51%. U.V. absorption data revealed: λ max.=3500; ε=24,200.

PREPARATION 5

Using the same procedure as in Preparation 4, 6-oxo-1-vinyl - 2,3,4,6,7,8-hexahydronaphthalene is reacted with the cyclopentane-1,3-dione derivatives listed in Table I to yield the corresponding gona - 4,8(14),9-triene-3,17-dione compounds.

TABLE I

Cyclopentane-1,3-dione derivative:
  2-ethyl-cyclopentane-1,3-dione
  2-isopropyl-cyclopentane-1,3-dione
  2-n-propyl-cyclopentane-1,3-dione
  2-n-butyl-cyclopentane-1,3-dione
Corresponding gona-4,8(14),9-triene-3,17 dione:
  13-ethyl-gona-4,8(14),9-triene-3,17-dione
  13-isopropyl-gona-4,8(14),9-triene-3,17-dione
  13-n-propyl-gona-4,8(14),9-triene-3,17-dione
  13-n-butyl-gona-4,8(14),9-triene-3,17-dione In accordance with the above procedures, gona-4,8 (14),9-triene-3,17-dione is prepared from the interaction of 6 - oxo-1-vinyl-2,3,4,6,7,8-hexahydronaphthalene and cyclopentane-1,3-dione.

This preparation illustrates the preparation of 13-$R_2$-gona-4,8(14),9-triene-3,17-dione wherein $R_2$ is a hydrogen atom or a lower alkyl radical.

The following non-limiting examples are given by way of illustration only.

*Example 1*

This example illustrates the preparation of 13-methyl-17α - chloroethynyl - 17-hydroxy-gona-4,8(14),9-triene-3-one. The reaction may be represented as follows:

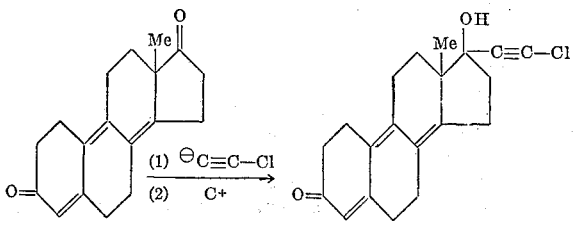

A solution of 0.144 ml. cis-dichloroethylene in 0.45 ml. dry ether is added to a solution of sodamide in 4.5 ml.

liquid ammonia (prepared from 105 mg. sodium), thereby forming the chloroacetylide carbanion in situ, and the resulting mixture is refluxed (circa −30° C.) for 30 minutes. To this is added a solution of 300 mg. of the 13-methyl - gona-4,8(14),9-triene-3,17-dione obtained from Preparation 4 in 3 ml. dry tetrahydrofuran and refluxing (circa −30° C.) is continued for 1½ hours. After cooling to room temperature, the product is poured onto a mixture of $NH_4Cl$ and ice, extracted with ether and the ether extract washed with dilute HCl, aqueous $NaHCO_3$, water and then dried. The extract is then chromatographed on acid washed alumina and eluted with benzene-chloroform mixtures to yield 150 mg. of 13-methyl - 17α -chloroethynyl-17-hydroxy-gona-4,8(14),9-triene-3-one, M.P.: 159–160° C. Analysis of the product found C=72.97%, H=6.45%; calculated C=72.98%, H=6.39%. U.V. absorption data revealed: λ max.=3575, ε=19,850.

The corresponding 17α-bromoethynyl compound is similarly prepared by replacing the cholorethylene with an equivalent quantity of cis-dibromoethylene.

*Example 2*

Using the same procedure as in Example 1, cis-dichloroethylene or cis-dibromoethylene is reacted with the 13 - alkyl - gona-4,8(14),9-triene-3,17-dione compounds listed in Table I of Preparation 5 to yield, respectively, the corresponding 13 - alkyl - 17α - haloethynyl-17β-hydroxy - gona - 4,8(14),9-triene-3-one compounds tabulated in Table II.

TABLE II 13-ethyl-17α-chloroethynyl-17β-hydroxy-gona-4,8(14),9-triene-3-one
13-isopropyl-17α-chloroethynyl-17β-hydroxy-gona-4,8(14),9-triene-3-one
13-n-propyl-17α-chloroethynyl-17β-hydroxy-gona-4,8(14),9-triene-3-one
13-n-butyl-17α-chloroethynyl-17β-hydroxy-gona-4,8(14),9-triene-3-one
13-ethyl-17α-bromoethynyl-17β-hydroxy-gona-4,8(14),9-triene-3-one
13-isopropyl-17α-bromoethynyl-17β-hydroxy-gona-4,8(14),9-triene-3-one
13-n-propyl-17α-bromoethynyl-17β-hydroxy-gona 4,8(14),9-triene-3-one
13-n-butyl-17α-bromoethynyl-17β-hydroxy-gona-4,8(14),9-triene-3-one
13-methyl-17α-bromoethynyl-17β-hydroxy-gona-4,8(14),9-triene-3-one

*Example 3*

To 76 ml. of dry distilled liquid ammonia is added in portions 1.455 g. of sodium metal. After each of the first 3–4 portions, one crystal of ferric nitrate is added and the mixture stirred until the blue color disappears and the gray sodamide precipitates. The balance of the sodium is added portion-wise without the use of ferric nitrate.

After completion of the preparation of the sodamide, 2.1 ml. of cis-dichloroethylene in 6.6 ml. of dry ether is added dropwise with Dry Ice cooling. The cooling is discontinued and the reaction mixture allowed to reflux for 30 minutes.

To this mixture is added 6.5 g. of 13-methyl-gona-4-ene-3,17-dione in 65 ml. of dry tetrahydrofuran in portions over a period of 10 minutes. The thick reaction mixture is stirred well for 4 hours. At the end of this period, excess ammonium chloride is added to destroy excess sodium. Approximately 100 ml. of ether is added and the ammonia allowed to evaporate. The reaction mixture is then poured into an ice-water mixture, the ether phase separated and the aqueous phase extracted with ether. The combined ether extracts are dried, filtered and the solvent removed under low pressure. The product, 13-methyl - 17α - chloroethynyl - 17β - hydroxy - gona - 4-ene-3-one may be purified by recrystallization or chromatographically.

This procedure is utilized to prepare the following compounds utilizing the appropriate steroid starting material; and, where necessary replacing the dichloroethylene with an equivalent quantity of cis-dibromoethylene. With the last five compounds, an equivalent quantity of potassium is employed in place of the sodium.

13-methyl-17α-bromoethynyl-17β-hydroxy-gona-4-ene-3-one
13-ethyl-17α-bromoethynyl-17β-hydroxy-gona-4-ene-3-one
13-n-propyl-17α-bromoethynyl-17β-hydroxy-gona-4-ene-3-one
13-isopropyl-17α-bromoethynyl-17β-hydroxy-gona-4-ene-3-one
13-n-butyl-17α-bromoethynyl-17β-hydroxy-gona-4-ene-3-one
13-ethyl-17α-chloroethynyl-17β-hydroxy-gona-4-ene-3-one
13-n-propyl-17α-chloroethynyl-17β-hydroxy-gona-4-ene-3-one
13-n-isopropyl-17α-chloroethynyl-17β-hydroxy-gona-4-ene-3-one
13-n-butyl-17α-chloroethynyl-17β-hydroxy-gona-4-ene-3-one
13-methyl-17α-chloroethynyl-17β-hydroxy-gona-4,9(10)-dione-3-one
13-ethyl-17α-chloroethynyl-17β-hydroxy-gona-4,9(10)-dione-3-one
13-n-propyl-17α-chloroethynyl-17β-hydroxy-gona-4,9(10)-dione-3-one
13-isopropyl-17α-chloroethynyl-17β-hydroxy-gona-4,9(10)-dione-3-one
13-n-butyl-17α-chloroethynyl-17β-hydroxy-gona-4,9(10)-dione-3-one
13-methyl-17α-bromoethynyl-17β-hydroxy-gona-4,9(10)-dione-3-one
13-ethyl-17α-bromoethynyl-17β-hydroxy-gona-4,9(10)-dione-3-one
13-isopropyl-17α-bromoethynyl-17β-hydroxy-gona-4,9(10)-dione-3-one
13-n-butyl-17α-bromoethynyl-17β-hydroxy-gona-4,9(10)-dione-3-one

*Example 4*

A total of 2.5 g. of 13-methyl-17α-chloroethynyl-17β-hydroxy-gona-4-ene-3-one is taken up in 100 ml. of glacial acetic acid and 2.5 g. of zinc powder is added over a period of one hour at room temperature with good stirring. Stirring is continued for an additional 4 hours. The precipitate is filtered, washed with chloroform and the combined filtrates diluted with chloroform and washed successively with water, three times with dilute aqueous sodium bicarbonate and again with water. The chloroform solution is dried, filtered and concentrated under low pressure to precipitate 13-methyl-17α-ethynyl-17β-hydroxy-gona-4-ene-3-one which may be purified by crystallization.

This procedure is followed for the reduction of the 17α-chloroethynyl and 17α-bromoethynyl compounds prepared as described above to prepare the following compounds:

13-ethyl-17α-ethynyl-17β-hydroxy-gona-4-ene-3-one
13-n-propyl-17α-ethynyl-17β-hydroxy-gona-4-ene-3-one
13-isopropyl-17α-ethynyl-17β-hydroxy-gona-4-ene-3-one
13-n-butyl-17α-ethynyl-17β-hydroxy-gona-4-ene-3-one
13-methyl-17α-ethynyl-17β-hydroxy-gona-4,9(10)-dione-3-one
13-ethyl-17α-ethynyl-17β-hydroxy-gona-4,9(10)-dione-3-one
13-n-propyl-17α-ethynyl-17β-hydroxy-gona-4,9(10)-dione-3-one 13-isopropyl-17α-ethynyl-17β-hydroxy-gona-4,9(10)-dione-3-one
13-methyl-17α-ethynyl-17β-hydroxy-gona-4,8(14),9(10)-triene-3-one
13-ethyl-17α-ethynyl-17β-hydroxy-gona-4,8(14),9(10)-triene-3-one
13-n-propyl-17α-ethynyl-17β-hydroxy-gona-4,8(14),9(10)-triene-3-one
13-isopropyl-17α-ethynyl-17β-hydroxy-gona-4,8(14),9(10)-triene-3-one
13-n-butyl-17α-ethynyl-17β-hydroxy-gona-4,8(14),9(10)-triene-3-one

*Examples 5–7*

The following table summarizes the procedures of specific examples for the preparation of 13-methyl-17α-chloroethynyl-17β-hydroxy-gona-4-ene-3-one. All reactions are carried out in liquid ammonia.

TABLE III

| Ex. | Moles of Steroid | Moles of Dichloroethylene | Solvent | Moles of Sodium | Reflux Period, hrs. |
|---|---|---|---|---|---|
| 5 | 0.5 | 0.5 | THF | 0.5 | 24 |
| 6 | 1.0 | 1.0 | Dioxane | 1.0 | 1.5 |
| 7 | 0.5 | 1.0 | n-Butyl ether | 1.0 | 4 |

*Examples 8–11*

The following table summarizes the procedures of specific examples for the preparation of 13-methyl-17α-ethynyl-17β-hydroxy-gona-4-ene-3-one form the corresponding chloroethynyl compound (Examples 8 and 9) and bromoethynyl compound (Examples 10 and 11).

TABLE IV

| Example | Grams of Steroid | Grams of Zinc | Temp., °C. | Acid | Reaction Period, hrs. |
|---|---|---|---|---|---|
| 8 | 2 | 1 | 20 | Acetic | 24 |
| 9 | 2 | 4 | 30 | Butyric | 2 |
| 10 | 2 | 2 | 25 | Acetic | 4 |
| 11 | 2 | 1 | 100 | do | 1 |

What is claimed is:

1. A process for the haloethynylation of gona-4-ene-3,17-diones and B- and C- ring unsaturated derivatives thereof in which the double bonds are conjugated with the double bond at the 4-position, and in which the keto groups at C-3 and C-17 are both in free unprotected form, to produce the corresponding 17α-haloethynyl-17β-hydroxy-gona-4-ene-3-ones which comprises reacting the said 3,17-diones with a dihaloethylene in liquid ammonia in the presence of an alkali metal amide, said dihaloethylene being selected from the group consisting of dichloroethylene and dibromoethylene.

2. A process as in claim 1 wherein the dihaloethylene is cis-dichloroethylene and the compound produced is a 17α-chloroethynyl compound.

3. A process as in claim 1 wherein the starting gona-4-ene is 13-methyl-gona-14,8(14),9-triene-3,17-dione, the dihaloethylene is cis dichloroethylene and the compound produced is 13-methyl-17α-chloroethynyl - 17β - hydroxy-gona-4,8(14),9-triene-3-one.

4. A process as in claim 1 wherein the starting gona-4-ene is 13-methyl-gona-4-ene-3,17-dione, the dihaloethylene is cis-dichloroethylene and the compound produced is 13-methyl-17α-chloroethynyl-17β-hydroxy-gona-4-ene-3-one.

5. A process as in claim 1 wherein the starting gona-4-ene is 13-methyl-gona-4,9-diene-3-one, the dihaloethylene is cis-dichloroethylene and the compound produced is 13-methyl-17α-chloroethynyl-17β-hydroxy-gona - 4,9 - diene-3-one.

6. A process as in claim 1 wherein the starting gona-4-ene is 10,13-dimethyl-gona-4-ene-3-one, the dihaloethylene is cis-dichloroethylene and the compound produced is 13-methyl-17α-chloroethynyl-17β-hydroxy-gona - 4 - ene-3-one.

References Cited

UNITED STATES PATENTS 3,202,684   8/1965   Burn et al.   260—397.5

OTHER REFERENCES

Tadanier et al., "J. Org. Chem." 26–2436 (1961).

ELBERT L. ROBERTS, *Primary Examiner.*